(12) United States Patent
Barmettler et al.

(10) Patent No.: US 8,327,714 B2
(45) Date of Patent: Dec. 11, 2012

(54) PRESSURE GAUGE WITH PRESSURE GAUGE ASSEMBLY AND CONNECTING ASSEMBLY

(75) Inventors: Peter Barmettler, Hunenberg (CH); Andreas Arnold, Hitzkirch (CH); Alex Disler, Ebikon (CH); Andreas Kolb, Sulz (CH)

(73) Assignee: WIKA Alexander Wiegand GmbH & Co., KG, Klingenberg (DE)

( * ) Notice: Subject to any disclaimer, the term of this patent is extended or adjusted under 35 U.S.C. 154(b) by 249 days.

(21) Appl. No.: 12/480,174

(22) Filed: Jun. 8, 2009

(65) Prior Publication Data

US 2009/0301213 A1 Dec. 10, 2009

(30) Foreign Application Priority Data

Jun. 9, 2008 (DE) .......................... 10 2008 002 312

(51) Int. Cl.
*G01L 9/00* (2006.01)

(52) U.S. Cl. ........................................... 73/753; 73/700

(58) Field of Classification Search ........................ None
See application file for complete search history.

(56) References Cited

U.S. PATENT DOCUMENTS

| | | | | |
|---|---|---|---|---|
| 3,511,273 A * | 5/1970 | Bartholomaus | ............... | 137/557 |
| 3,881,358 A * | 5/1975 | Wolfges | ........................ | 73/756 |
| 4,196,634 A * | 4/1980 | Hehl | ............................. | 73/756 |
| 4,420,981 A * | 12/1983 | Schoen | ........................ | 73/756 |
| 4,827,983 A * | 5/1989 | Hoffmann | ................. | 137/899.4 |
| 6,050,147 A * | 4/2000 | Viduya et al. | ................. | 73/756 |
| 6,584,850 B2 * | 7/2003 | Colby | ............................ | 73/700 |
| 6,619,129 B2 * | 9/2003 | Pitzer | ............................ | 73/715 |
| 6,763,725 B1 * | 7/2004 | Huang | ........................... | 73/756 |
| 6,769,308 B1 * | 8/2004 | Pitzer | ............................ | 73/715 |

* cited by examiner

*Primary Examiner* — Lisa Caputo
*Assistant Examiner* — Jermaine Jenkins
(74) *Attorney, Agent, or Firm* — Baker & Hostetler LLP

(57) ABSTRACT

A pressure gauge comprises a pressure gauge assembly and a connecting assembly. The pressure gauge assembly includes a measuring pressure port for the pressure to be measured and the connecting assembly includes a pressure measuring port. The pressure gauge assembly is adapted to be connected to the connecting assembly. In order to permit a relative rotation between the pressure gauge assembly and the connecting assembly, the pressure gauge assembly and/or the connecting assembly supports at least one annular passage section connecting the measuring pressure port to the pressure measuring port.

15 Claims, 2 Drawing Sheets

PRESSURE GAUGE WITH PRESSURE GAUGE ASSEMBLY AND CONNECTING ASSEMBLY

CROSS-REFERENCE TO RELATED APPLICATIONS

This application claims priority to German Patent Application 10 2008 002 312.4, filed on Jun. 9, 2008, the disclosure of which is incorporated herein by reference in its entirety.

FIELD OF THE INVENTION

The invention relates to a pressure gauge comprising a pressure gauge assembly and a connecting assembly, wherein, in the assembled state, a rotation of the pressure gauge assembly relative to the connecting assembly is possible.

BACKGROUND OF THE INVENTION

Pressure gauges are known which comprise a pressure gauge assembly and a connecting assembly. In this type of pressure gauges, the pressure gauge assembly and the connecting assembly are fixedly connected to each other and the connecting assembly is connected to an object at which a pressure is to be measured. However, in said pressure gauges a twisting between the pressure gauge assembly and the connecting assembly is not possible due to the design.

SUMMARY OF THE INVENTION

Embodiments of the present invention advantageously provide a pressure gauge comprising a pressure gauge assembly and a connecting assembly which permits a rotation of the pressure gauge assembly relative to the connecting assembly.

According to embodiments of the present invention, the pressure gauge includes a pressure gauge assembly comprising a measuring pressure port for the pressure to be measured. Furthermore said pressure gauge has a connecting assembly including a pressure measuring port and being adapted to be connected to the pressure gauge assembly. The pressure gauge assembly and/or the connecting assembly support at least one annular passage portion. Said annular passage portion serves for connecting the measuring pressure port to the pressure measuring port and permits to twist the pressure gauge assembly relative to the connecting assembly.

If the pressure gauge is intended to detect differences in pressure between two pressure sources, it is necessary for the pressure gauge assembly to include two measuring pressure ports and for the connecting assembly to include two pressure measuring ports. In order to connect the two measuring pressure ports of the pressure gauge assembly to the two pressure measuring ports of the connecting assembly and, simultaneously, ensure twistability of the two assemblies with respect to each other, an annular passage portion and a central through-bore can preferably be employed.

The pressure gauge assembly and/or the connecting assembly preferably include(s) at least two annular passage portions. By way of two annular passage portions it is possible to supply two different pressures to the pressure gauge assembly but at the same time to keep free a central space adapted to be used otherwise.

It is desirable that the annular passage portions are concentric. Depending on the length of the annular passage portions, the assemblies can be twisted with respect to each other. However, the two annular passage portions to be differently pressurized can also be located on a common circle. In that case, the twistability is limited to a maximum of 180° with equal pitch.

Also, the at least one annular passage portion can be circumferential. This arrangement permits the pressure gauge assembly to be rotated by 360° relative to the connecting assembly.

The pressure gauge assembly can exhibit a mechanical metering element having a meter movement and a display. It is possible that the metering element, the meter movement or the display are picked off electrically. The electric pickoff can be performed by a Hall sensor, for instance, but it can be performed by other adequate sensors as well. The electric pickoff can be picked off to the outside. It is desirable, in this context, that the pickoff is performed to the outside by means of a multi-polar, centrally arranged jack plug. However, also other electric connections are possible, such as a sliding contact connection.

Furthermore, the pressure gauge assembly can be connected to the connecting assembly by way of a bayonet lock, the latter having a pre-detent and a setting area. This permits to easily and very quickly connect the pressure gauge assembly and the connecting assembly and to easily align the members with respect to one another.

It is desired that the bayonet lock has four connecting points offset by 90° with respect to one another. However, it is not compulsory to have four connecting points. The number of connecting points and/or the offset of the connecting points with respect to one another rather can be freely chosen in an appropriate manner.

It is also possible that the pressure gauge assembly is connected to the connecting assembly by means of locking parts engaging in a circumferential groove. It can be freely selected which of the two assemblies includes the groove and/or the locking parts. The groove need not be completely circumferential, either. Also, groove sections into each of which, for instance, a respective locking part engages are possible. Not all of said groove sections need to be formed at one assembly. It is also an option to form groove sections offset at both assemblies. The assemblies may also be connected by sleeve screwing.

The connecting assembly can be either concealed or surface-mounted at a wall.

It is desirable to provide the pressure measuring port at the side or at the rear of the connecting assembly.

Further objects, advantages and aspects will be resulting from the attached claims, the description of the embodiments and the drawings.

DETAILED DESCRIPTION

Figure 1:
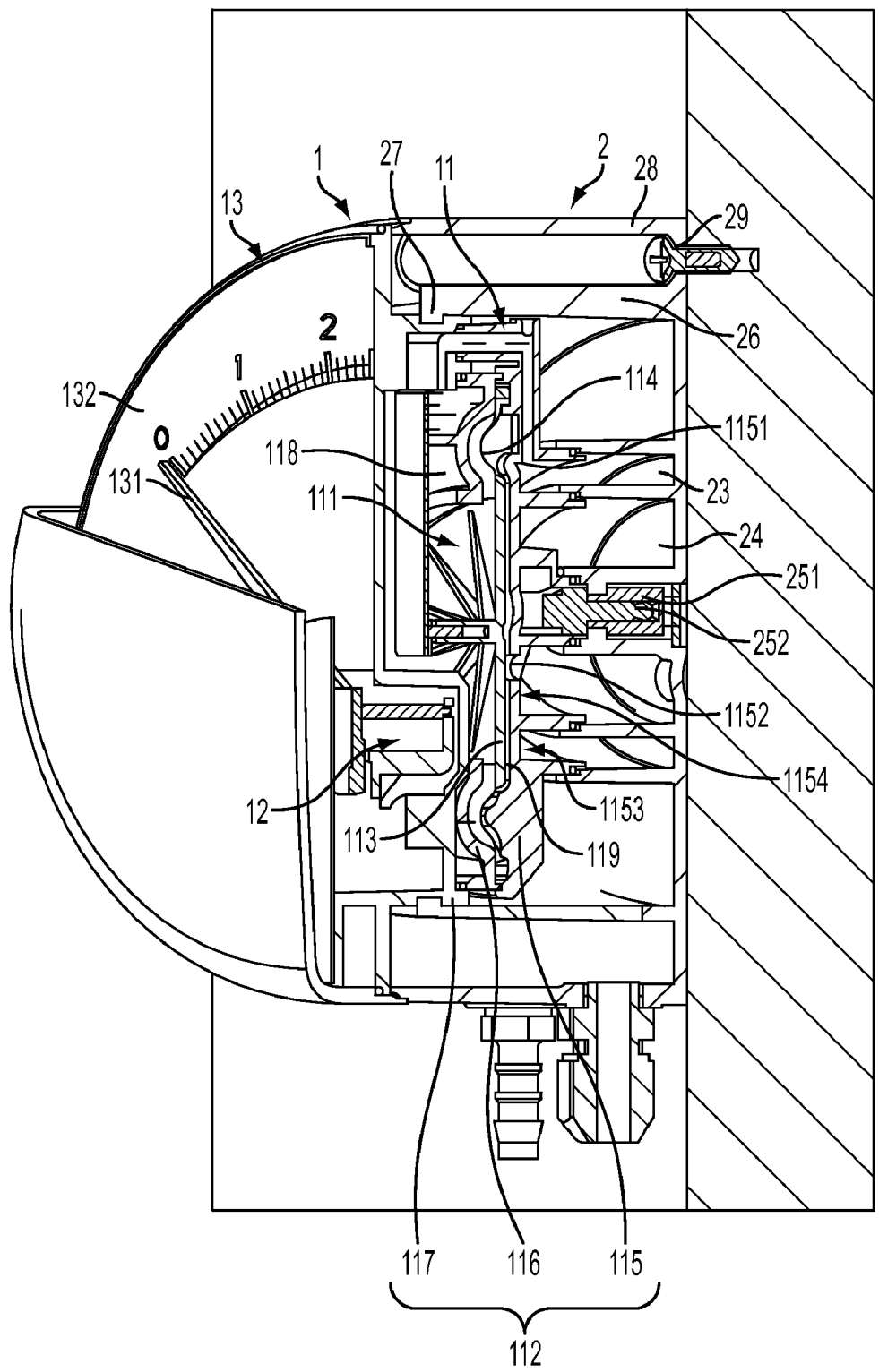
FIG. 1 shows a sectional view of the pressure gauge, according to an embodiment of the present invention.

The invention will now be described with reference to the drawing figures, in which like reference numerals refer to like parts throughout.

In the embodiment the pressure gauge is realized as differential pressure gauge. FIG. 1 illustrates the structure of the pressure gauge. The pressure gauge assembly 1 mainly consists of a mechanical metering element 11 to which a meter movement 12 and a display 13 are operatively connected.

Moreover, the mechanical metering element 11 includes a sensor, not shown, for electrically picking off a movement of the metering element 11.

The metering element 11 in the current case consists of a membrane 111 and a membrane support 112.

The membrane 111 has a two-part structure including a disk-shaped central portion 113 and an edge portion 114 connected to the central portion 113 and completely enclosing the edge thereof. In the current case, the central portion 113 is circular. It may also have other shapes, however.

The central portion 113 and the edge portion 114 are made of silicone, but they can be made of any other suited material as well. The membrane 111 need not be completely manufactured of one material, either, but the material of the central portion 113 can be different from the material of the edge portion 114. The central portion 113 of the membrane 111 must be stiffer than the edge portion 114. This is due to the fact that the edge portion 114 serves as elastic suspension of the central portion 113 so that the latter is moved as a whole and uniformly.

In order to prevent the central portion 113 from deforming, according to the embodiment in addition reinforcing ribs extending radially outwardly from the middle of the central portion 113 are formed integrally with the central portion 113. In this embodiment the edge portion 114 is semi-circular in cross-section. A wave-shaped or zigzag-folded cross-section of the edge portion 114 is also possible, however.

The membrane support 112 consists of three parts, viz. a base plate 115, a fastening ring 116 and a cover plate 117. The membrane 111 is inserted between the base plate 115 and the fastening ring 116 so that the central portion 113 of the membrane 111 remains movable. In this way it is obtained that merely the outer edge of the edge portion 114 of the membrane 111 is clamped between the base plate 115 and the fastening ring 116.

On the base plate 115 the cover plate 117 is disposed such that the fastening ring 116 is clamped between the base plate 115 and the cover plate 117 and is fixed by the same. Furthermore, the base plate 115 and the cover plate 117 together form a pressure chamber subdivided by the membrane 111 into a pressure chamber 118 at the display side and a pressure chamber 119 at the side of the connecting assembly. Pressure is introduced into each of said pressure chambers 118, 119 so that the membrane 111 moves corresponding to the pressure difference prevailing between the two pressure chambers 118, 119.

For applying pressure, at the side of the connecting assembly the base plate 115 includes two measuring pressure ports 1151, 1152 communicated to the pressure chambers 118, 119. In accordance with the embodiment, the measuring pressure port and the pressure chamber 119 at the side of the connecting assembly are communicated through an aperture in the base plate 115. In order to provide the communication between the other measuring pressure port and the pressure chamber 118 at the display side, it is necessary to by-pass the pressure around the membrane 111. According to the embodiment, this is performed by way of a passage formed in the base plate 115 and the cover plate 117, said passage extending in the base plate 115 first toward the edge of the base plate and then toward the cover plate 117 and opens into the latter. In the cover plate 117 the passage is then further guided to the display-side pressure chamber 119. The connection of the two partial passage sections in the base plate 115 and the cover plate 117 is obtained by an O-ring packing in accordance with the embodiment.

Furthermore, the base plate 115 includes, on the side of the measuring pressure ports 1151, 1152, two annular passages 1153, 1154 into each of which one of the measuring pressure ports 1151, 1152 opens. The annular passages 1153, 1154 have a concentric shape. In the embodiment the passages are formed by grooves in the base plate 115, the walls of the grooves being lengthened in rib shape beyond the end of the base plate 115 so that the walls of said annular passages extend away from the base plate 115 toward the connecting assembly 2. It is also an option, however, that only grooves are formed in the base plate 115 as annular passages or that, instead of the grooves, merely the annular passage walls are formed integrally with the surface of the base plate 115. Furthermore, a sensor adapted to detect the movement of the membrane 111 is provided in the metering element 11. In the present case, said sensor is mounted at the fastening ring 116. But the sensor can also be mounted at any other position as long as, during movement of the membrane 111, the sensor remains stationary with respect to the latter. The signals generated by said sensor are transmitted via connection leads to a jack plug 252, for instance a commercially available 3.5 mm jack plug, disposed centrally in the base plate 115 of the metering element 11.

The mechanical meter movement 12 is operatively connected to the central portion 113 of the membrane 111. By virtue of this connection, a movement of the membrane 111 can be converted into a rotation of a pointer 131.

The display 13 comprises the pointer 131 and a dial 132 and serves for optically displaying a measured value. The dial 132 is supported by the cover plate 117 in the embodiment.

In the embodiment, the pressure gauge assembly 1 is fastened in the connecting assembly 2. The connecting assembly 2 has two pressure measuring ports. In order to connect the measuring pressure ports 1151, 1152 of the pressure gauge assembly 1 to the pressure measuring ports 21, 22 of the connecting assembly 2, likewise two annular passages communicated with the annular passages of the pressure gauge assembly 1 are formed in the connecting assembly 2. Said annular passages are formed on a base plate 115 of the connecting assembly 2 and enable the pressure gauge assembly 1 to be twisted relative to the connecting assembly 2. A respective pressure measuring port 21, 22 of the connecting assembly 2 opens into an annular passage 23, 24 of the connecting assembly 2. In the center of the connecting assembly 2 furthermore a jack socket 251 is provided for receiving the jack plug 252 disposed at the base plate 115 of the metering element 11. A lead is guided from said jack plug 251 to the outside of the connecting assembly 2.

Apart from the annular passages 23, 24, the pressure measuring ports 21, 22 and the jack plug 251, the connecting assembly 2 moreover includes another wall 26 disposed concentrically with respect to the annular passages 23, 24 which serves for fastening the pressure gauge assembly 1. More exactly speaking, the wall 26 has several projections 27 engaging in a groove which is appropriately formed in the cover plate 117 of the pressure gauge assembly 1.

Instead of such snap fit, it is also possible to connect the pressure assembly 1 to the connecting assembly 2 by means of a bayonet lock.

In addition to the afore-described wall 26, the connecting assembly 2 has an outer wall 28 which primarily serves for accommodating a fastening aperture 29 of the connecting assembly 2. Through said fastening aperture 29 the connecting assembly 2 can be fastened via a screw to any other object, such as a casing, for instance. The outer wall 28 is not absolutely necessary, however. The base plate 115 of the connecting assembly 2 might as well project from the afore-described wall 26 as a flange and support the fastening apertures 29.

Moreover, it is also possible to dispense with the wall 26 and materialize the function thereof by the side wall of the outer annular passage.

Hereinafter, possible alternatives of connecting the pressure measuring ports of the connecting assembly 2 to the measuring pressure ports 1151, 1152 of the pressure gauge assembly 1 shall be discussed. In the embodiment, the annular passages are tightly connected to each other by axial overlapping of the side walls thereof and an O-ring packing being clamped there between. For this purpose, the embodiment provides shoulders at the free annular passage wall ends into which a packing ring is inserted.

It is also conceivable, however, that either of the two annular passages to be connected is formed by a groove in the base plate 115, wherein no side wall of said annular passage protrudes from the base plate 115. In this case, the annular passage to be connected can be shaped so that the side walls thereof project into the groove and are sealed against the side walls of the groove by a packing ring.

Figure 2A:
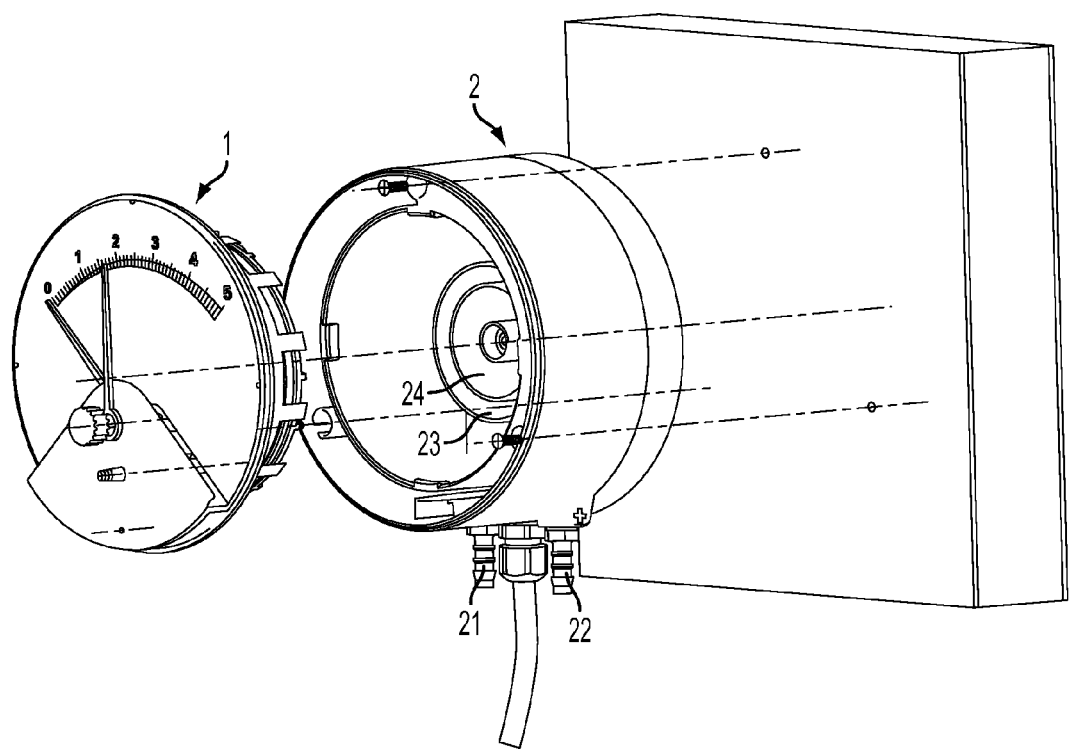
FIGS. 2A and 2B show perspective views of different types of mounting the pressure gauge, according to embodiments of the present invention.
Figure 2B:
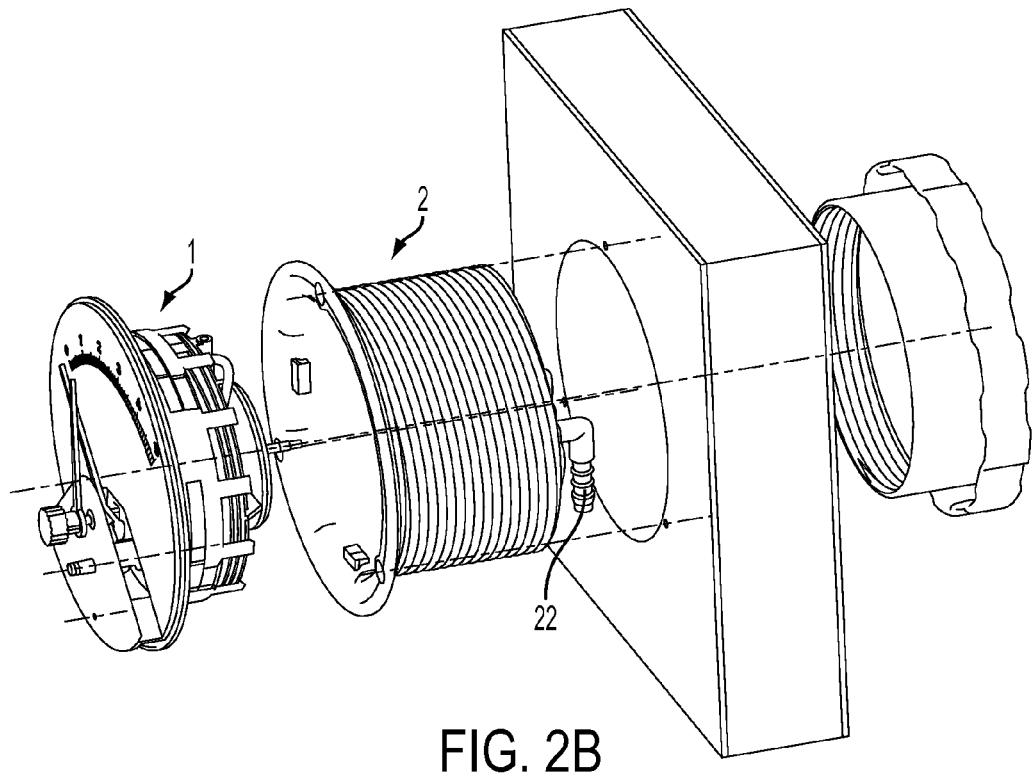

As illustrated in FIGS. 2A and 2B, the pressure gauge can be mounted in various ways. More exactly speaking, FIG. 2A exemplifies a surface mounting of the pressure gauge, whereas FIG. 2B shows a concealed mounting of the pressure gauge. As can be inferred from said figures, it is preferable to provide the pressure measuring ports 21, 22 laterally at the connecting assembly 2. In the case of concealed mounting it is desirable, on the other hand, to provide the pressure measuring ports 21, 22 at the rear of the connecting assembly 2.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A pressure gauge for detecting differences in pressure between two pressure sources, comprising:
    a pressure gauge assembly including two measuring pressure ports, one for each pressure source; and
    a connecting assembly including two pressure measuring ports, one for each pressure source, adapted to be connected to the pressure gauge assembly,
    wherein the pressure gauge assembly and/or the connecting assembly supports two annular passage sections, each connecting one measuring pressure port to one pressure measuring port, that permit a rotation of the pressure gauge assembly, relative to the connecting assembly, to adjust the orientation of the pressure gauge assembly without disconnecting the measuring pressure ports from the pressure measuring ports.

2. The pressure gauge according to claim 1, wherein the annular passage sections are concentric.

3. The pressure gauge according to claim 1, wherein at least one annular passage section has a circumferential shape.

4. The pressure gauge according to claim 1, wherein the pressure gauge assembly includes a mechanical metering element having a meter movement and a display.

5. The pressure gauge according to claim 1, wherein an electric pickoff is performed from the metering element, the meter movement or the display.

6. The pressure gauge according to claim 5, wherein the electric pickoff is performed by a Hall sensor.

7. The pressure gauge according to claim 5, wherein the electric pickoff can be picked off to the outside by means of a multi-polar, centrally arranged jack plug.

8. The pressure gauge according to claim 1, wherein the pressure gauge assembly is connected to the connecting assembly by means of a bayonet lock, the latter having a detent and a setting area.

9. The pressure gauge according to claim 8, wherein the bayonet lock has four connecting points offset by 90° with respect to one another.

10. The pressure gauge according to claim 1, wherein the pressure gauge assembly is connected to the connecting assembly by means of locking parts which engage in a circumferential groove.

11. The pressure gauge according to claim 1, wherein the pressure gauge assembly is connected to the connecting assembly by means of sleeve screwing.

12. The pressure gauge according to claim 1, wherein the connecting assembly is adapted to be surface-mounted or concealed at a wall.

13. The pressure gauge according to claim 1, wherein the pressure measuring port is provided laterally or at the rear of the connecting assembly.

14. A pressure gauge, comprising:
    a pressure gauge assembly including a measuring pressure port for the pressure to be measured; and
    a connecting assembly having a pressure measuring port and being adapted to be connected to the pressure gauge assembly,
    wherein the pressure gauge assembly and/or the connecting assembly supports at least one annular passage section connecting the measuring pressure port to the pressure measuring port and permitting a rotation of the pressure gauge assembly relative to the connecting assembly, and
    wherein the pressure gauge assembly is connected to the connecting assembly by means of a bayonet lock, the latter having a detent and a setting area.

15. The pressure gauge according to claim 14, wherein the bayonet lock has four connecting points offset by 90° with respect to one another.

* * * * *